UNITED STATES PATENT OFFICE.

HENRY URTEL, OF LA SALLE, NEW YORK, ASSIGNOR TO THE CARBORUNDUM COMPANY, OF NIAGARA FALLS, NEW YORK, A CORPORATION OF PENNSYLVANIA.

METHOD OF MAKING ABRASIVE ARTICLES.

1,243,783.  Specification of Letters Patent.  Patented Oct. 23, 1917.

No Drawing.  Application filed January 31, 1914. Serial No. 815,799.

*To all whom it may concern:*

Be it known that I, HENRY URTEL, a citizen of the United States, residing at La Salle, in the county of Niagara and State of New York, have invented a new and useful Improvement in Methods of Making Abrasive Articles, of which the following is a full, clear, and exact description.

This invention relates to the manufacture of abrasive bodies or articles, of the type wherein an abrasive material is combined with a binder containing an alkali metal, such as silicate of sodium. According to the well known method of using silicate of sodium as a binding material in the manufacture of grinding wheels and other abrasive articles the abrasive, such as corundum, aloxite or carborundum in the form of grains, is incorporated with the liquid silicate of sodium and thoroughly mixed to a homogeneous mass. The mixture is tamped into iron molds or pressed into the shapes desired and the articles are then placed in ovens and baked at a temperature of from 180 to 200 degrees C. This results in a tough and hard article having excellent cutting properties for certain classes of work. It is nominally waterproof, but nevertheless has certain soluble constituents. Continued immersion in water has a certain softening effect upon the bond and weakens its tensile strength. When subjected to moisture for a considerable time, a white excrescence will appear on the surface of the wheel. Articles made in this manner always give an alkaline reaction.

According to my method, the articles produced are absolutely waterproof and are not affected by moisture. They also have cutting properties which are greatly superior to those of wheels manufactured by the old method.

I will now describe a preferred and typical method of carrying out my invention. I make a mixture consisting of

| | | |
|---|---|---|
| No. 36 aloxite grain | 86 | % |
| Silicate of sodium | 10 | % |
| Ground flint | 5 | % |
| Zinc oxid | 1.50 | % |

The aloxite is an abrasive material made in the electric furnace consisting substantially of fused crystalline alumina. The grade of silicate of sodium which I prefer to employ is a liquid containing about 33% $SiO_2$, 37% $Na_2O$ and 30% $H_2O$. The specific gravity is about 65 degrees Bé. Before using the silicate, I add 5% to 10% of water to thin it down. After the dry ingredients are thoroughly mixed, the silicate of sodium is added and the whole mass is mixed or kneaded until it becomes homogeneous. It is now formed by tamping or pressing into the shapes desired; and after drying, the articles are placed in a kiln in saggers or on clay forms and are rapidly fired to a temperature sufficient to fuse the sodium silicate and have it combine with the zinc oxid or other basic or metallic oxid which may be added to form a double silicate which is insoluble in water. The firing temperature is preferably between 850 degrees and 1100 degrees C.

This process employs an alkali silicate soluble in water, preferably sodium silicate, which is rendered insoluble when it is heated to a temperature sufficiently high to cause it to combine with the additional basic oxid. This insoluble compound is formed at 550 degrees C., but I prefer to bring the bond into a more complete state of fusion as greater strength and better uniformity are obtained thereby. I therefore preferably employ temperatures of from 850 to 1000 degrees C. The product so produced has no alkaline reaction and is insoluble in water. The bond has been converted into a glass. Other substances, such as powdered clay, may be added to the mix without departing from the spirit of my invention.

Abrasive wheels made in accordance with my process have great advantages over the ordinary silicate of sodium wheels, on account of their waterproof qualities and their free cutting properties. They are less tough, being of a fairly brittle and glassy nature, and are specially adapted for grinding highly tempered tool steels, such as cutters and reamers for internal, cylindrical and surface grinding. They also are superior to wheels of the variety known as vitrified wheels, especially on account of their free cutting qualities. The reason for this is that in the manufacture of a vitrified aloxite or other aluminous abrasive wheel, composed, as it is, of abrasive material bonded by fusible clays and feldspar, very high temperatures are employed in fusing this refractory bond and there is an appreciable amount of alumina dissolved from the abrasive which goes into solution with the bond. This is not only objectionable because the amount of abrasive material in the article is reduced by whatever amount goes into the solution, but is also detrimental because the sharp edges of the abrasive particles are dissolved and the particles are duller than they otherwise would be. This is especially objectionable for some classes of grinding, where a cool free-cutting abrasive is essential. With the lower temperatures employed in my process, the solvent action of the bond on the grain is practically eliminated; the abrasive particles retaining their original sharpness will remove the material from the object ground with a minimum of power and resultant heat.

I claim:

1. The method of making abrasive articles, which consists in shaping the articles from a mixture of fused crystalline alumina and a binder containing liquid silicate of sodium and zinc oxid, and firing to a temperature sufficient to form a double silicate of sodium and the zinc which is insoluble in water.

2. The method of making abrasive articles, which consists in shaping the articles from a mixture of fused crystalline alumina and a binder containing silicate of sodium, zinc oxid and flint, and firing to a temperature sufficient to form a double silicate of sodium and zinc which is insoluble in water.

3. The method of making abrasive articles, which consists in shaping the article from a mixture of an aluminous abrasive material and a binder containing silicate of sodium, zinc oxid and flint, and firing to a temperature sufficient to form a double silicate of sodium and zinc which is insoluble in water, but not sufficient to dissolve alumina from the abrasive in an amount sufficient to dull the abrasive grain.

In testimony whereof, I have hereunto set my hand.

HENRY URTEL.

Witnesses:
 F. J. TONE,
 DANIEL SULLIVAN.